United States Patent [19]

Sugden

[11] Patent Number: 4,600,413

[45] Date of Patent: Jul. 15, 1986

[54] CENTRIFUGAL DEAERATOR AND PUMP

[75] Inventor: Kenneth B. Sugden, Rockford, Ill.

[73] Assignee: Sundstrand Corporation, Rockford, Ill.

[21] Appl. No.: 680,146

[22] Filed: Dec. 10, 1984

[51] Int. Cl.[4] ............................................. B01D 19/00
[52] U.S. Cl. ......................................... 55/207; 55/52;
55/409; 55/459 R; 415/143
[58] Field of Search .................................... 55/202–207,
55/408, 409, 459 R, 201, 52, 189; 415/143;
494/56–58; 209/211

[56] References Cited

U.S. PATENT DOCUMENTS

| 2,818,047 | 12/1957 | Powell | 55/409 |
| 2,849,930 | 9/1958 | Freeman et al. | 55/52 |
| 3,342,408 | 9/1967 | Bergstrom | 233/18 |
| 3,973,930 | 8/1976 | Burgess | 55/52 |
| 4,178,234 | 12/1979 | Bobo | 494/57 X |

Primary Examiner—Charles Hart
Attorney, Agent, or Firm—Wood, Dalton, Phillips, Mason & Rowe

[57] ABSTRACT

Turbulance hindering degassification in a centrifugal degassifier is minimized through the provision of a generally cylindrical rotary degassifier housing (10). The housing includes an inlet (28) for a liquid containing entrained gas and outlets (40, 42) for degassified liquid. Generally radially extending passageways (44) provide for more rapid removal of gas emerging from the mixture in the interior of the degassifier, thereby reducing turbulance.

14 Claims, 8 Drawing Figures

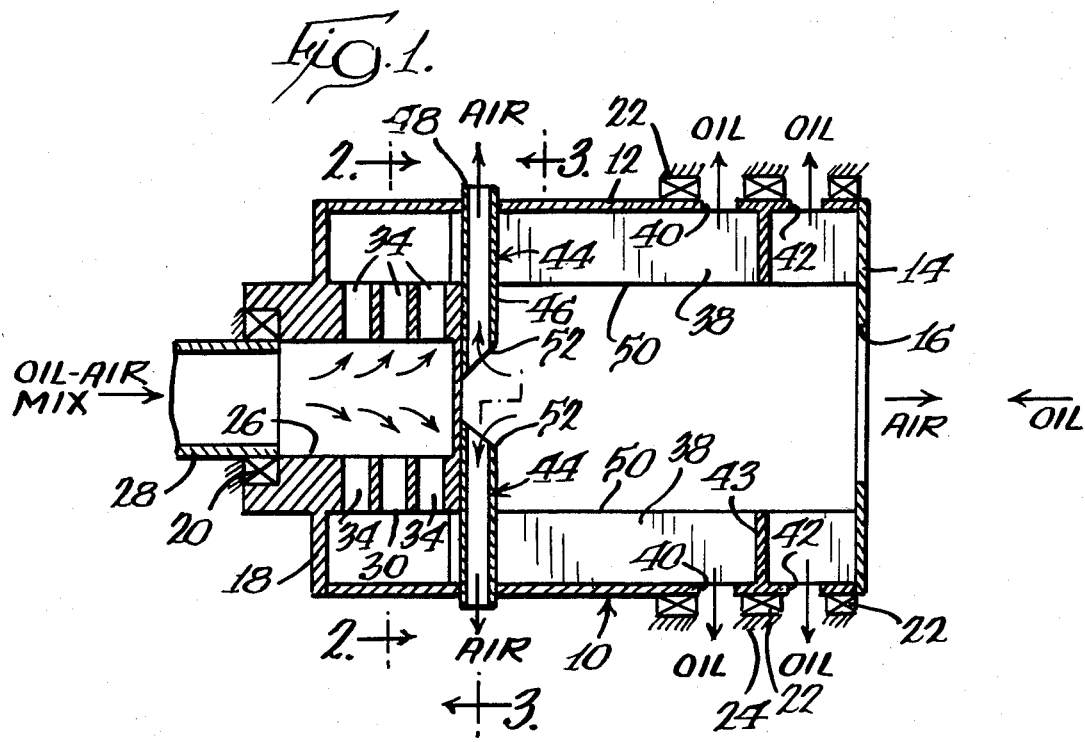
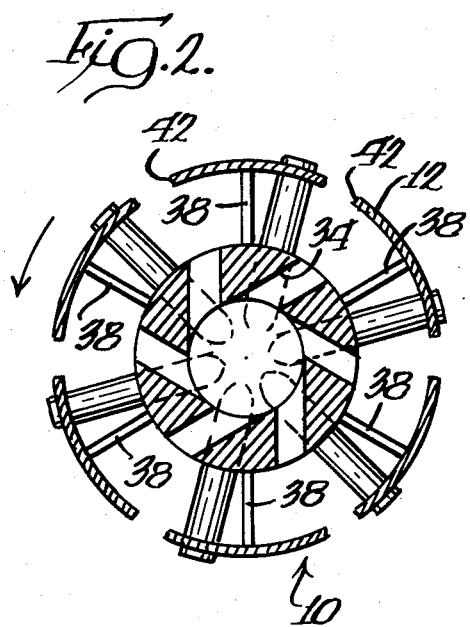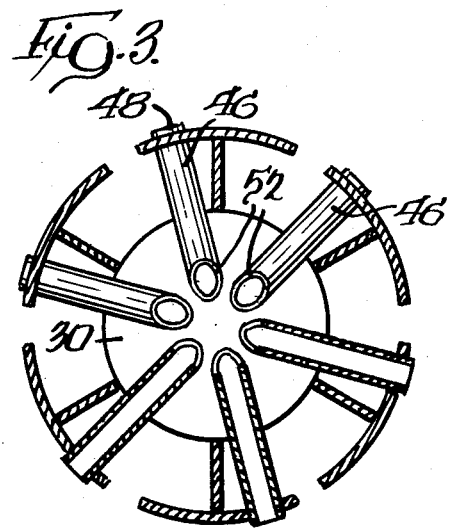

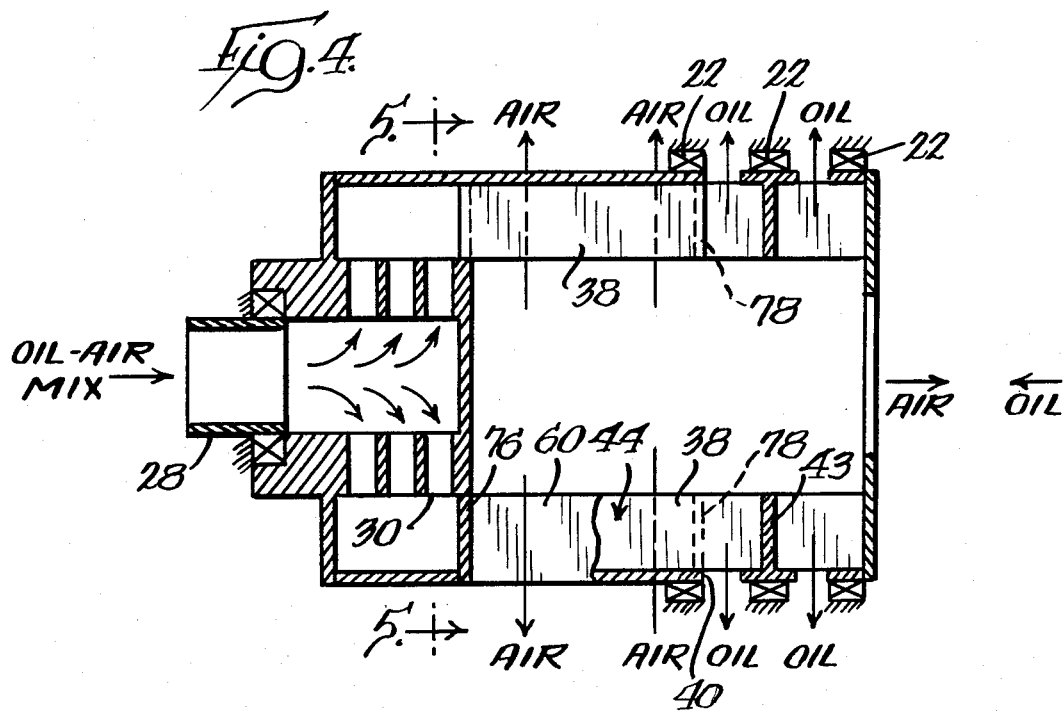
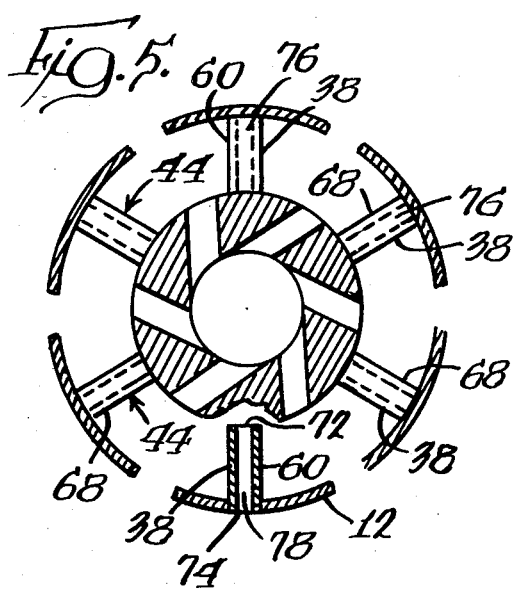
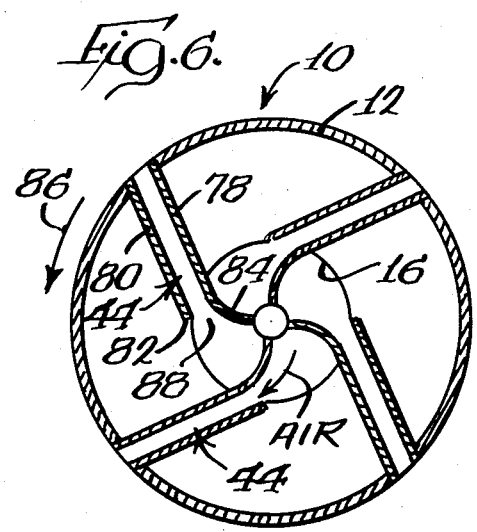

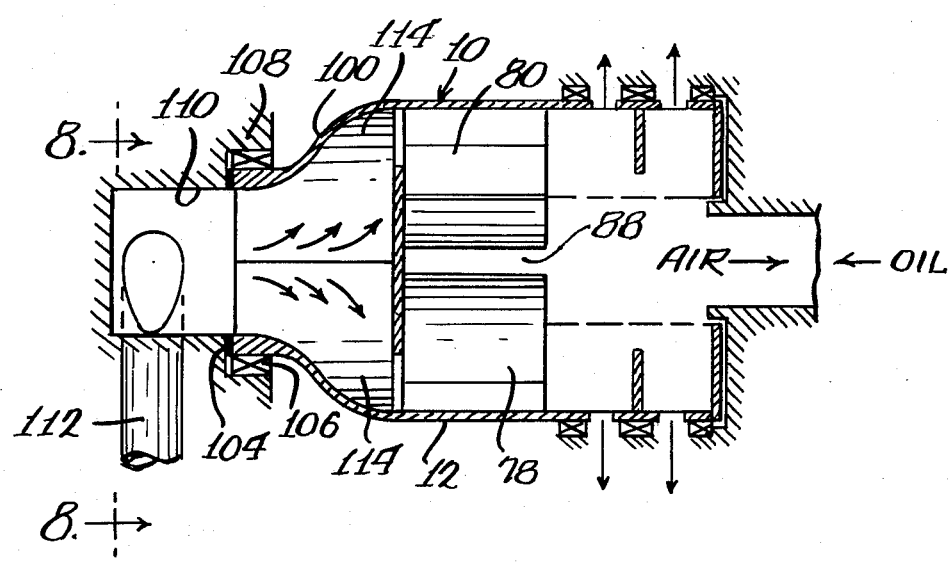
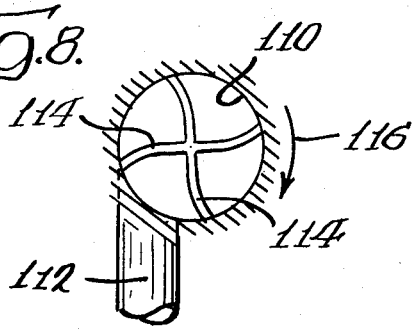

CENTRIFUGAL DEAERATOR AND PUMP

FIELD OF THE INVENTION

This invention relates to a degassifier for removing entrained gas from a liquid, and more specifically, to a deaerator for removing air from hydraulic fluid or the like, which utilizes centrifugal force to effect the aeration, and which may also serve as a pump in a system in which it is used.

BACKGROUND OF THE INVENTION

Centrifugal liquid deaerators have been utilized in hydraulic systems over a prolonged period of time. In the course of operation of many hydraulic systems, air becomes entrained in the hydraulic fluid. The presence of entrained air may cause a number of difficulties in system operation, a foremost being "cavitation" which can damage parts of the system. Another problem brought about by the presence of entrained air is what may be termed "sponginess". In hydraulic systems, the hydraulic fluid is typically regarded as incompressible and the system designed about that premise. However, when a gas such as air becomes entrained in the fluid, it adds a perceptible measure of compressibility to the fluid so that system actions are not as positive, i.e., become spongy, as a result of compression and/or expansion of the entrained gas due to system pressure changes.

Deaerators then, have been employed to rid systems of these and other deleterious effects of entrained gas in hydraulic fluid. More recently, where centrifugal deaerators have been employed, the deaerator may also act as a boost pump to charge a fixed displacement pump or provide deaerated lubricant and/or coolant to components parts of the systems at relatively low pressure. In general, such centrifugal deaerators and pumps take on the form of a generally cylindrical housing which is mounted for rotation about its cylindrical axis. Liquid to be degassified is directed into the housing, generally on its axis at one end of the housing while the housing is spinning about its axis. Axially extending blades within the housing cause the entering flow to rotate with the housing.

At locations remote from the liquid inlet, the cylindrical wall of the housing is provided with a plurality of deaerated liquid outlets. On the housing axis opposite the inlet is an axially directed gas outlet.

Because the liquid will have a higher density than the gas, the centrifugal force imparted to the mixture during rotation of the housing will cause the liquid to move radially outwardly to form an annular body of liquid within the rotating housing. The head in the annular body of liquid will drive any entrained gas out of the liquid and such gas will move radially inwardly towards the axis, being less affected by the centrifugal force as a result of its drastically lesser density.

Consequently, the liquid may travel axially within the housing from the inlet to the outlets in the cylindrical wall of the housing to be expelled therefrom under some pressure by reason of the centrifugal force acting on it. This factor allows the deaerator to be used as a boost pump. At the same time, the body of gas within the annular body of fluid will move axially within the housing to the gas outlet as it is being continually displaced by additional gas entrained in incoming fluid.

While such constructions have worked well for their intended purpose, it is desirable to improve their efficiency. The present invention is directed to providing such an improvement.

SUMMARY OF THE INVENTION

It is the principal object of the invention to provide a new and improved degassifier for a liquid with entrained gas therein. More specifically, it is an object of the invention to provide an improved centrifugal degassifier which can additionally operate as a pump. It is also an object of the invention to provide an improved degassifier that operates with improved degassifying efficiency. A further object of the invention is to provide a centrifugal pump and degassifier construction which may be utilized in aircraft hydraulic systems and which will function as a pump even through unusual attitudes such as extreme roll or pitch maneuvers of the aircraft in which the construction is used.

An exemplary embodiment of the invention achieves the foregoing objects in a rotary degassifier comprising a generally cylindrical housing. Means are provided for mounting the housing for rotation about its cylindrical axis and means are adjacent one end of the housing for introducing a liquid containing entrained gas into the housing.

Means are adjacent the other end of the housing and radially outwardly of the axis for defining an liquid outlet for degassified liquid and means are provided in the housing spaced from the introducing means to define a generally radially elongated gas passage terminating in a gas outlet from the housing and a gas inlet within the housing. The gas inlet is disposed radially inwardly of the liquid outlet.

A degassifier made according to the foregoing provides improved efficiency since radial discharge of gas allows one to improve the evacuation of gas from the interior of the housing thereby enhancing degassification.

In one embodiment, the passage comprises a tube. The tube may be disposed on a line extending radially from the axis or, the tube may be canted with respect to the axis so that its gas inlet faces in the direction of intended rotation of the housing and further improve gas evacuation.

Alternatively, the passage may be defined by side-by-side axially elongated blades. The blades may further serve as means for inducing rotation of a liquid containing entrained gas as it is introduced into the housing to facilitate centrifugal degassification.

In a highly preferred embodiment, a combination inlet/outlet port is disposed on the axis of rotation of the housing at the end thereof opposite from the liquid inlet. This port may serve, in normal operation, as an additional outlet for gas to further increase the rate of gas evacuation from the housing. Alternatively, when used in an aircraft hydraulic system and when the aircraft is undergoing unusual attitudes, the port may serve as an inlet for hydraulic fluid to allow continued pumping of hydraulic fluid by the apparatus even though the principal inlet may become uncovered during such an unusual attitude.

The invention further contemplates an improved inlet wherein the liquid to be degassified is introduced into the housing in a generally tangential direction to minimize turbulence, which undesirably mixes the liquid with the entrained gas, at the inlet.

Other objects and advantages will become apparent from the following specification taken in connection with the accompanying drawings.

DESCRIPTION OF THE DRAWINGS

FIG. 1 is a sectional view of one embodiment of a centrifugal degassifier-pump made according to the invention;

FIG. 2 is a sectional view taken approximately along the line 2—2 in FIG. 1;

FIG. 3 is a sectional view taken approximately along the line 3—3 in FIG. 1;

FIG. 4 is a view similar to FIG. 1 but of a modified embodiment of the invention;

FIG. 5 is a sectional view taken approximately along the line 5—5 in FIG. 4;

FIG. 6 is a view similar to FIGS. 3 and 5 but showing still a further modified embodiment of the invention;

FIG. 7 is a view similar to FIGS. 1 and 4 but showing an embodiment with a modified and preferred form of the inlet; and FIG. 8 is a sectional view taken approximately along the line 8—8 in FIG. 7.

DESCRIPTION OF THE PREFERRED EMBODIMENT

One embodiment of a centrifugal degassifier-pump made according to the invention is illustrated in FIG. 1 and with reference thereto is seen to include a housing, generally designated 10. As best seen in FIGS. 2 and 3, the housing 10 includes a cylindrical sleeve 12 capped at one end by a disc 14 (FIG. 1) which is provided with a central opening 16 such that the opening 16 lies on the axis of the sleeve 12.

The opposite end of the housing 10 is capped by an inlet casting 18. Bearings 20 associated with the casting 18, as well as bearings 22 associated with the sleeve, journal the housing 10 for rotation about its cylindrical axis relative to a stationary frame or the like, shown schematically at 24.

The casting 18 includes a central cavity 26. One end 28 of a feed tube is disposed partially in the cavity 26 for directing an air-oil mixture, that is, a liquid with a gas entrained therein, into the cavity 26 and thus serves as an inlet.

The casting 18 further includes an axial extension 30 which extends somewhat into the sleeve 12 and which includes a series of passages 34 which open to the exterior of the extension 30 radially inwardly of the sleeve 12 and which extend to the central cavity 26 to merge therewith in a generally tangential fashion.

As mentioned previously, to accomplish deaeration or degassification, centrifugal separation is employed which necessitates the rotation of the housing 10 about its cylindrical axis. Before the air-oil mixture applied to the interior of the housing 10 can be subjected to the centrifugal force necessary to effect the separation, such mixture must be made to rotate with the housing 10. The configuration of the passages 34 is designed to accomplish this purpose then the housing 10 is rotated in a generally counterclockwise direction as viewed in FIG. 2.

The interior of the housing is also provided with axially extending blades 38 at regular angular intervals which extend from about the innermost end of the extension 30 to the cap 14 and which serve to assure that the liquid within the housing rotates with the same.

At locations remote from the inlet provided by the tube 28, and specifically, adjacent the opposite end of the housing 12 as defined by the cap 14, the sleeve 12 is provided with a series of oil outlets in the form of apertures 40 and 42 at locations between the blades 38.

If desired, an annular dam 43 may be located between the outlet openings 40 and 42. The dam 43 is termed a "priority dam" and it will be appreciated that when there is sufficient liquid within the housing to overflow the dam 43, liquid will emerge through both of the outlets 40 and 42. Conversely, when there is insufficient liquid to spill over the dam 43, oil will emerge only through the outlets 40. Thus, where a hydraulic system in which the apparatus is used includes some components having a high priority for oil, they may be connected to the outlets 40 by suitable conventional means with other components, having a lesser priority for oil, connected to the outlets 42, also by conventional means.

The structure is completed by a plurality of generally radially extending passages, generally designated 44. The passages 44 are defined in the embodiment illustrated in FIGS. 1-3 by tubes 46 which pass through suitable openings in the sleeve 12 to terminate in open ends 48 which act as outlet ends for the passages 44. The tubes 46 also extend generally radially inwardly past the radially inner edges 50 of the blades 38 to terminate in inlets 52 located adjacent the cylindrical axis of the housing 10. As best seen in FIGS. 1 and 3, the inlets 52 are beveled and face away from the extension 30 of the casting 18. The passages 44 thus defined serve as generally radially extending air outlets.

Those knowledgeable in the art will appreciate that in prior art constructions, the sole air outlet will be that defined by the central opening 16 in the cap 14. In contrast, the present invention includes additional air outlets provided by the passages 44. This provides for better evacuation of gas at the inner diameter of the housing 10 which in turn promotes degassification of the annulus of liquid at the outer diameter of the housing 10. In particular, it has been observed that the oil-air mixture is subject to increasing turbulence as the axis of the device is approached from a radially outer point. There are more bubbles present as the center of the housing is approached, apparently due to an increasing amount of gas emerging from the annular body of liquid as the centrifugal force and head of the liquid is reduced as the center of the apparatus is approached. Such turbulence impedes deaeration or degassification and the presence of the radially directed air outlet has been found to unexpectedly reduce such turbulence thereby providing an enhanced measure of degassification by allowing the separated gas to more rapidly exit the housing 10.

Another advantage of the foregoing structure comes when the same is used as a pump as well as a degassifier, particularly in an aircraft hydraulic system. For normal aircraft attitudes, a typical hydraulic system will be designed so that the oil-air mixture will be provided in normal fashion to the housing 10 through the tube 28. However, if the aircraft containing such system goes through maneuvers which may involve unusual attitudes, as, for example, inverted flight or extremely steep banks, it will be appreciated that the inlet to the pump in that part of the system providing the air-oil mixture to the housing 10 may become uncovered. As a consequence, the quantity of degassified oil within the housing 10 will quickly be depleted by the pumping action provided by the blades 38 with the result that hydraulic components of the system downstream of the degassifier may ultimately be starved of oil.

In the present invention, because the opening 16 in the cap 14 is not reserved solely as an air outlet, it may serve as an oil inlet when the housing 10 moves towards an inverted position with the aircraft undergoing unusual attitudes. Those skilled in the art will recognize that in prior art deaerators, the port 16 will be in fluid communication with a reservoir for the oil or the like such that droplets of oil entrained in the exiting air are returned to the system. Such a reservoir, as the housing 10 moves towards an inverted position, will come into fluid communication with the opening 16 while continued rotation of the housing 10 will be tending to pump air or gas out of the housing 10 through the passages 44. Consequently, the resulting induced pressure differential will tend to draw oil from the reservoir into the housing 10 through the port 16 during such unusual attitudes, from which point it may be pumped to system components in the same fashion mentioned above.

A modified embodiment of the invention is illustrated in FIGS. 4 and 5. For simplicity, the components common to both embodiments will not be redescribed and are given the same reference numerals. In the embodiment of FIG. 4, the passages 44 are not defined by tubes 46. Rather, each of the blades 38 is paired with a blade 60 in generally parallel, but spaced, relation as can be best seen in FIG. 5. The spaces are shown at 70 and define the passageways 44. Each space 70 opens to the interior of the housing 10 at the radially inner edges of the blades 38 and 60 to thereby define an entrance or inlet 72 to the passage defined by the space 70. As seen in FIG. 5, the plates 38 and 60 may extend through elongated slots in the sleeve 12 such that their radially outer spaced edges define an outlet 74 for the passages defined by the spaces 70.

To prevent oil or a portion of the oil-air mixture from entering the passages thus defined, the ends of the blades 38 and 60 adjacent the innermost end of the extension 30 are capped by a cross plate 76 as seen in FIGS. 4 and 5. Immediately adjacent the oil outlets 40, a similar cross plate 78 extends between the blades 38 and 60 in each pair.

The embodiment of FIGS. 4 and 5 provides an advantage in that the tubes 46 may be done away with and yet their function preserved in defining passageways 44 by making dual use of the blades 38.

FIG. 6 illustrates still a further modification. In this embodiment, closely spaced, parallel, paired blades 78 and 80, which approximately correspond the blades 38 and 60 are also used. However, the blades 78 and 80 are disposed to be canted or somewhat tangential to a circle approximately aligned with the central opening 16.

The plates 80 terminate in a radially inner end 82 somewhat spaced from the axis of rotation of the apparatus while the plates 78 include a curved bend 84 which extends generally to such axis. As a consequence, when the housing 10 is rotated in a direction of an arrow 86, it will be seen that the radially inner opening 88 between the plates 78 and 80 acts as a ram air inlet for the separated gas at the interior of the annular body of oil within the apparatus. This configuration further improves the ability of the apparatus to achieve more rapid air evacuation to thereby provide improved deaeration.

It should be appreciated that, if desired, where tubes such as the tubes 46 are employed, the radially inner ends may also be shaped to provide a ram air type pickup arrangement.

A further modified embodiment is illustrated in FIGS. 7 and 8 and includes a preferred form of inlet structure by which the liquid containing entrained gas may be introduced into the degassifier. The same may be used with particular efficacy with the form of the invention utilizing the gas outlets constructed as shown in FIG. 6. Again, where like components are employed, like reference numerals are utilized and will not be redescribed.

In the embodiment shown in FIGS. 7 and 8, the inlet end of the housing 10, shown at 100, is generally cupped shape having an enlarged diameter end 102 merging with the cylindrical sleeve 12 forming part of the housing 10. At its end opposite the end 102, the inlet 100 has a reduced diameter open end 104 which is journalled in bearings 106 received in any suitable fixed structure 108.

The fixed structure 108 also includes a cylindrical recess 110 aligned with the end 104 and in fluid communication therewith. An inlet tube 112 extends to the recess 110 and as best seen in FIG. 8, merges tangentially therewith.

In lieu of the distributing passages 34 as employed in the embodiments of FIGS. 1 and 4, the inlet end 100 is provided with a plurality of generally radially extending, S-shaped vanes 114 oriented as shown in FIG. 8 for a direction of rotation indicated by an arrow 116.

As a consequence of this construction, the vanes 114 at the inlet bring the liquid with the entrained gas up to the rotational speed of the housing 10 in a minimum amount of elapsed time after introduction of the liquid through the tube 112. As a consequence, there is a minimum amount of turbulance generated in the incoming liquid and the elimination of such turbulance minimizes additional mixing of the liquid and the entrained gas. Thus, the larger gas bubbles may find their way directly to the rotational axis of the housing 10 to exit through the radially extending air passages. Moreover, the provision of means for introducing the liquid with entrained gas tangentially to the recess 110 further reduces turbulance at the inlet to enhance the effect.

From the foregoing it will be appreciated that the invention provides a more efficient centrifugal deaerator/pump. Not only is deaeration enhanced by the provision of the generally radially extending air outlet passages, but the ability of the apparatus to serve as a pump even when approaching inversion allows elimination of inversion pumps customarily separately provided in systems where inversion and uncovering of the principal inlet is of concern.

I claim:

1. A rotary degassifier comprising a generally cylindrical housing;
    means mounting said housing for rotation about its cylindrical axis;
    a first gas outlet from said housing generally on said axis;
    means and adjacent one end of said housing for introducing a liquid containing entrained gas;
    means adjacent the other end of said housing and radially outwardly of said axis defining a liquid outlet for degassified liquid; and
    means in said housing spaced from said introducing means defining a generally radially elongated gas passage terminating in a second gas outlet from said housing and gas inlet within said housing, said gas inlet being disposed radially inwardly of said liquid outlet.

2. The rotary degassifier of claim 1 wherein said passage comprises a tube.

3. The rotary degassifier of claim 2 wherein said tube is disposed on a line extending radially from said axis.

4. The rotary degassifier of claim 1 wherein said passage is canted with respect to said axis so that said gas inlet faces in the direction of intended rotation of said housing.

5. The rotary degassifier of claim 4 wherein said passage is defined by a tube.

6. The rotary degassifier of claim 1 wherein said passage is disposed on a line extending radially from said axis.

7. The rotary degassifier of claim 6 wherein said passage is defined by side by side, axially elongated blades.

8. The rotary degassifier of claim 1 wherein said passage is defined by side by side, axially elongated blades.

9. A centrifugal degassifier and pump comprising:
an elongated housing having an axis extending in the direction of elongation;
means mounting said housing for rotation about said axis;
means for introducing a liquid containing entrained gas into said housing at a location radially inwardly of the housing periphery;
axially elongated blades on the interior of said housing extending radially inwardly from the periphery of said housing but stopping short of said axis, said blades being paired and each pair of said blades defining a gas passage;
liquid outlets in said housing periphery at locations axially spaced from said introducing means;
gas outlets in said housing periphery;
means isolating said liquid outlets and said gas outlets comprising said gas passages, said gas passages extending generally radially to terminate in gas inlets in fluid communication with the interior of said housing and located at least as far radially inwardly as the radially innermost parts of said blades;
said housing being cylindrical with said periphery comprising a cylindrical wall of said housing, said gas and liquid outlets being disposed in said cylindrical wall and said introducing means being located on said axis; and
a port communicating with said housing and disposed on said axis remote from said introducing means.

10. A centrifugal degassifier and pump comprising:
an elongated housing having an axis extending in the direction of elongation;
means mounting said housing for rotation about said axis;
means for introducing into said housing a liquid containing entrained gas at a location radially inwardly of the housing periphery;
axially elongated blades on the interior of said housing extending radially inwardly from the periphery of said housing but stopping short of said axis;
liquid outlets in said housing periphery at locations axially spaced from said introducing means;
a first gas outlet in said housing and located on said axis;
second gas outlets in said housing periphery; and
means isolating and liquid outlets and said second gas outlets comprising gas passages in fluid communication with said second gas outlets and extending generally radially to terminate in gas inlets for said passages in fluid communication with the interior of said housing.

11. The centrifugal degassifier and pump of claim 10 wherein said gas inlets are located at least as far radially inwardly as the radially innermost parts of said blades.

12. The centrifugal degassifier and pump of claim 11 wherein said blades are paired and each pair thereof define one of said passages.

13. The centrifugal degassifier and pump of claim 11 wherein said passages are defined by generally radially directed tubes located between said blades.

14. A centrifugal degassifier and pump comprising an elongated housing having an axis extending in the direction of elongation;
means mounting said housing for rotation about said axis;
means on said axis at one end of said housing for introducing into said housing a liquid containing entrained gas at a location radially inwardly of the housing periphery;
axially elongated blades on the interior of said housing extending radially inwardly from the periphery of said housing but stopping short of said axis;
liquid outlets in said housing periphery at locations axially spaced from said introducing means;
gas outlets in said housing periphery;
means isolating said liquid outlets and said gas outlets comprising gas passages in fluid communication with said gas outlets and extending generally radially to terminate in gas inlets for said passages in fluid communication with the interior of said housing; and
a combination inlet-outlet port in said housing and on said axis at the end of said housing opposite said one end.

* * * * *